(12) United States Patent
Nakajima et al.

(10) Patent No.: US 8,177,439 B2
(45) Date of Patent: May 15, 2012

(54) CAPILLARY TUBE FOR HOLDING AN OPTICAL FIBER

(75) Inventors: Sotohiro Nakajima, Shiga (JP); Hirokazu Takeuchi, Shiga (JP)

(73) Assignee: Nippon Electric Glass Co., Ltd., Shiga (JP)

(*) Notice: Subject to any disclaimer, the term of this patent is extended or adjusted under 35 U.S.C. 154(b) by 182 days.

(21) Appl. No.: 12/537,419

(22) Filed: Aug. 7, 2009

(65) Prior Publication Data

US 2011/0033160 A1 Feb. 10, 2011

(30) Foreign Application Priority Data

Aug. 27, 2008 (JP) .................................. 2008-218246

(51) Int. Cl.
G02B 6/00 (2006.01)
G02B 6/36 (2006.01)
G02B 6/38 (2006.01)

(52) U.S. Cl. .............................. 385/68; 385/84; 385/137
(58) Field of Classification Search .................. 385/68
See application file for complete search history.

(56) References Cited

U.S. PATENT DOCUMENTS

| 4,691,986 | A  | * | 9/1987  | Aberson et al. | 385/66  |
| 4,752,111 | A  | * | 6/1988  | Fisher         | 385/55  |
| 5,980,117 | A  |   | 11/1999 | Feuer et al.   |         |
| 6,709,169 | B2 | * | 3/2004  | Rossi          | 385/92  |
| 6,810,691 | B2 | * | 11/2004 | Fagan et al.   | 65/276  |

FOREIGN PATENT DOCUMENTS

JP           10-73742          3/1998

* cited by examiner

Primary Examiner — Charlie Peng
Assistant Examiner — Mary El Shammaa
(74) Attorney, Agent, or Firm — Wenderoth, Lind & Ponack, L.L.P.

(57) ABSTRACT

A capillary tube holds an optical fiber. The capillary tube includes an insertion hole for inserting and fixing the optical fiber formed therein, a cylindrical surface as an outer circumferential surface, and a groove formed in the cylindrical surface in an axial direction thereof. Regions from the cylindrical surface to both inner side surfaces of the groove each have a projecting curved surface, and regions from both the inner side surfaces of the groove to a bottom of the groove each have a recessed curved surface.

8 Claims, 4 Drawing Sheets

CAPILLARY TUBE FOR HOLDING AN OPTICAL FIBER

BACKGROUND OF THE INVENTION

1. Field of the Invention

The present invention relates to capillary tubes for holding an optical fiber, and more specifically, to a capillary tube for holding an optical fiber, in which an insertion hole for inserting and fixing an optical fiber is formed. An outer circumferential surface is constituted as a cylindrical surface, and a region that serves as a mark is formed at a predetermined position in a circumferential direction of the cylindrical surface.

2. Description of the Related Art

As well known in the related art, the capillary tube for holding an optical fiber (hereinafter also simply referred to as capillary tube) normally includes an insertion hole to which one or a plurality of optical fibers is inserted and fixed at a periphery of a central axis, and is formed as a columnar body in which an outer circumferential surface is the cylindrical surface. This type of capillary tube is faced to and connected to an optical component in a circular inner hole (hole in which an inner circumferential surface is constituted as a cylindrical surface) of an external cylinder tube represented by a cylindrical tube, where the opposing end surface of the capillary tube is angle polished with the opposing end surface of the optical component to reduce the insertion loss of light in such case. This capillary tube is normally caused to adhere and fixed in the circular inner hole of the external cylinder tube by an adhesive.

In a case of angle polishing the end surface of the capillary tube, the tilt direction needs to be accurate, and thus the region that serves as a mark for visually recognizing the tilt direction is formed at a predetermined position in the circumferential direction of the capillary tube. Specifically, in the related art, one portion of the cylindrical surface of the capillary tube is formed as a flat portion, and the tilt direction in angle polishing is visually recognized with such flat portion as the mark. In this case, it is not easy to visually recognize the flat portion in distinction from the cylindrical surface, and thus the large dimension in the width direction of the flat portion needs to be set for ensuring accuracy in visual recognition.

However, the lacking portion of the volume of the capillary tube is large if the large dimension in the width direction of the flat portion is set, and thus the amount of adhesive filled between the inner circumferential surface of the external cylinder tube and the outer circumferential surface of the capillary tube becomes partially in excess. When the cured adhesive expands or contracts due to temperature change and the like, there are problems that the excessive adhesive may push the capillary tube thereby degrading the optical characteristics or the adhesive may delaminate due to thermal expansion difference.

JP 10-73742 A does not aim to avoid such problems described above caused by the adhesive but discloses formation of a groove of V-shaped cross-section instead of a flat portion at the cylindrical surface of the capillary tube. According to the method of forming the groove at the cylindrical surface of the capillary tube, the existing drawbacks that arise when the filled amount of adhesive is partially excessive can be expected to be avoided when such capillary tube is inserted to the external cylinder tube such as the cylindrical tube, and then caused to adhere and fixed thereto.

However, the capillary tube disclosed JP 10-73742 A described above merely aims to form the groove of V-shaped cross-section at the cylindrical surface as a mark, and thus a projecting angulated portion exists between the cylindrical surface and both inner side surfaces of the groove and a recessed corner portion exists at the bottom of the groove.

If the projecting angulated portion or the recessed corner portion (in particular, projecting angulated portion) exists at the outer circumferential surface of the capillary tube, chips, cracks, and the like tend to easily occur when handling, conveying, or transporting the capillary tube. Further, even when the circular inner hole of the external cylinder tube is filled with adhesive and the external cylinder tube and the capillary tube are relatively rotated for positioning in the circumferential direction, there is a risk that chips, cracks, and the like may occur at the angulated portion due to resistance and the like at the time of slidable movement or the rotation of the external cylinder tube and the capillary tube. Moreover, glass fragments may mix into the adhesive due to occurrence of chips, cracks, and the like. The glass fragments inhibit the relative rotation of the external cylinder tube and the capillary tube, which more easily causes chips and the like to occur.

Further, when the adhesive is filled between the external cylinder tube and the capillary tube, and the external cylinder tube and the capillary tube are relatively rotated as described above, a crucial problem that air bubbles may mix into the adhesive may arise when the resistance at the time of rotation becomes higher or inappropriate stirring is performed due to the existence of a plurality of angulated portions and corner portions at the outer circumferential surface of the capillary tube.

SUMMARY OF THE INVENTION

In view of the above-mentioned circumstances, the present invention aims to provide a capillary tube for holding an optical fiber capable of suppressing occurrence of chips, cracks, and the like in handling or in conveying or transportation, and capable of suppressing occurrence of chips, cracks, and the like and mixing of glass fragments or air bubbles to an adhesive as much as possible even when a circular inner hole of an external cylinder tube is filled with adhesive and the external cylinder tube and the capillary tube are relatively rotated.

In order to solve the above-mentioned technical problems, the present invention provides a capillary tube for holding an optical fiber comprising: an insertion hole for inserting and fixing the optical fiber formed therein; a cylindrical surface as an outer circumferential surface; and a groove formed in the cylindrical surface in an axial direction thereof, wherein regions from the cylindrical surface to both inner side surfaces of the groove each have a projecting curved surface, and regions from both the inner side surfaces of the groove to a bottom of the groove each have a recessed curved surface.

According to such configuration, the region from the cylindrical surface at the outer circumferential surface of the capillary tube to both inner side surfaces of the groove is formed with the projecting curved surface, and hence the projecting angulated portion no longer exists at the relevant region, and the possibility of occurrence of chips, cracks, and the like forming at the relevant region when handling or when transporting or conveying the capillary tube is reduced as much as possible. Further, according to the configuration of inserting the capillary tube into an external cylinder tube with a circular inner hole in which an inner circumferential surface is constituted as a cylindrical surface, and adhering and fixing the capillary tube with an adhesive, even when the adhesive is filled into the circular inner hole of the external cylinder tube and the external cylinder tube and the capillary tube are relatively rotated for positioning in the circumferential direction, possibility of occurrence of chips, cracks, and the like is suppressed and possibility of glass fragments mixing into the adhesive is suppressed because the projecting angulated portion is not present at the capillary tube. Therefore, the possibility of the relative rotation of the external cylinder tube and the capillary tube being inhibited by the presence of the glass fragments and the possibility chips and the like formed thereby is suppressed. Moreover, as the projecting angulated portion and the recessed corner portion are not present at the outer circumferential surface of the capillary tube, a resistance in time of rotation is avoided from becoming large or inappropriate stirring is avoided from being performed even if the external cylinder tube and the capillary tube are relatively rotated with the adhesive filled in between as described above, and thus a crucial problem that air bubbles mix into the adhesive is less likely to arise.

In this case, it is preferred that the projecting curved surface has one end smoothly continuous with the cylindrical surface and another end smoothly continuous with the inner side surface of the groove.

Accordingly, a step portion or a bent portion is completely eliminated between the projecting curved surface and the cylindrical surface, and between the projecting curved surface and the inner side surface of the groove, whereby the occurrence of chips and cracks and further, the glass fragments are more reliably suppressed.

On the other hand, the recessed curved surface may be configured so as to have one end smoothly continuous with one inner side surface of the groove and another end smoothly continuous with another inner side surface of the groove at the bottom of the groove.

Accordingly, the bottom of the groove is formed as a single recessed curved surface and the step portion or the bent portion is completely eliminated between the recessed curved surface and both inner side surfaces of the groove, and hence the occurrence of chips and cracks and further, glass fragments are more reliably suppressed in such case as well.

With this configuration, the one inner side surface and the another inner side surface of the groove may be configured so as to gradually approach each other toward the bottom of the groove.

Therefore, the bottom apex of the groove of V-shaped cross-section is formed with a single recessed curved surface, and hence the task of forming the groove is facilitated and the partial excess in the filling amount of the adhesive described above is effectively reduced.

The capillary tube including the above described configuration is preferable to be inserted to an external cylinder tube in which an inner circumferential surface is constituted as a cylindrical surface, and be caused to adhere and fixed by an adhesive.

Thus, the above described advantages when the adhesive is filled in the circular inner hole of the external cylinder tube and the external cylinder tube and the capillary tube are relatively rotated can be directly benefited.

Further, it is preferred that the capillary tube including the above described configuration be made of glass material, and the cylindrical surface and the surface of the groove are fire polished surfaces.

The surface roughness of the cylindrical surface of the capillary tube made of glass material and the surface of the groove (including projecting curved surface and recessed curved surface) thus becomes satisfactory and the resistance generated in time of relative rotation reduces, whereby drawbacks caused by the occurrence of chips and cracks or glass fragments during the adhering and fixing task by the adhesive can be further suppressed. The capillary tube may be made of ceramics or metal.

Further, in the configuration described above, it is preferred that a maximum depth of the groove be equal to or greater than 0.1% and equal to or smaller than 15% of a circumferential length at the outer circumferential surface of the capillary tube. In this case, the above-mentioned "maximum depth of the groove" means the distance from the lowest portion of the groove to a virtual extended line of the cylindrical surface.

In other words, if the maximum depth of the groove is smaller than 0.1% of the circumferential length at the outer circumferential surface of the capillary tube, the position in the circumferential direction of the capillary tube (tilt direction in angle polishing of the end surface) becomes difficult to recognize, and alignment of the capillary tube and the optical component to be faced thereto becomes difficult. On the other hand, if the maximum depth of the groove is greater than 15% of the circumferential length at the outer circumferential surface of the capillary tube, problems such as delaminated of the adhesive arise during the use after the capillary tube is caused to adhere and fixed to the external cylinder tube. In view of such aspects, the maximum depth of the groove is preferably equal to or greater than 0.5% and equal to or smaller than 10% of the circumferential length at the outer circumferential surface of the capillary tube.

Further, in the configuration described above, it is preferred that a maximum width of the groove be equal to or greater than 0.1% and equal to or smaller than 20% of the circumferential length at the outer circumferential surface of the capillary tube. In this case, the above-mentioned "maximum width of the groove" means the width between the positions to be each maximum curvature (minimum radius of curvature) of the projecting curved portions existing on both sides of the groove.

In this case as well, if the maximum width of the groove is smaller than 0.1% of the circumferential length at the outer circumferential surface of the capillary tube, the position in the circumferential direction of the capillary tube (tilt direction in angle polishing of the end surface) becomes difficult to recognize, and alignment of the capillary tube and the optical component to be faced thereto becomes difficult. On the other hand, if the maximum width of the groove is greater than 20% of the circumferential length at the outer circumferential surface of the capillary tube, problems such as delaminated of the adhesive arise during the use after the capillary tube is caused to adhere and fixed to the external cylinder tube. In view of such aspects, the maximum width of the groove is preferably equal to or greater than 0.5% and equal to or smaller than 10% of the circumferential length at the outer circumferential surface of the capillary tube.

Therefore, according to the capillary tube for holding an optical fiber according to the present invention, the region from the cylindrical surface at the outer circumferential surface of the capillary tube to both inner side surfaces of the groove is formed with the projecting curved surface, the projecting angulated portion no longer is formed at the relevant region, and the possibility of occurrence of chips, cracks, and the like forming at the relevant region when handling or when transporting or conveying the capillary tube is reduced as much as possible. Further, according to the configuration of inserting the capillary tube into an external cylinder tube with a circular inner hole in which an inner circumferential surface is constituted as a cylindrical surface, and adhering and fixing the capillary tube with an adhesive, even when the adhesive is filled into the circular inner hole of the external cylinder tube and the external cylinder tube and the capillary tube are relatively rotated for positioning in the circumferential direction, possibility of occurrence of chips, cracks, and the like is suppressed and possibility of glass fragments mixing into the adhesive is suppressed. Further, as the projecting angulated portion and the recessed corner portion are not present at the outer circumferential surface of the capillary tube, a resistance in time of rotation is avoided from becoming large or inappropriate stirring is avoided from being performed even if the external cylinder tube and the capillary tube are relatively rotated with the adhesive filled in between as described above, and thus a crucial problem that air bubbles mix into the adhesive is less likely to arise.

DETAILED DESCRIPTION OF THE PREFERRED EMBODIMENT

A capillary tube for holding an optical fiber according to an embodiment of the present invention is described below with reference to the accompanied drawings. The capillary tube may be made of ceramics or metal material, but a capillary tube made of glass material is described in the following embodiment by way of example.

Figure 1:
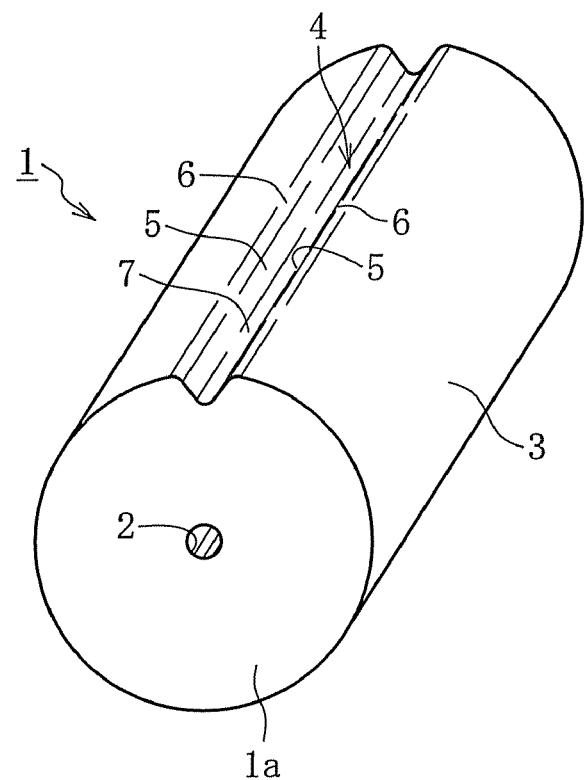
FIG. 1 is a perspective view illustrating an overall configuration of a capillary tube for holding an optical fiber according to an embodiment of the present invention.
Figure 2:
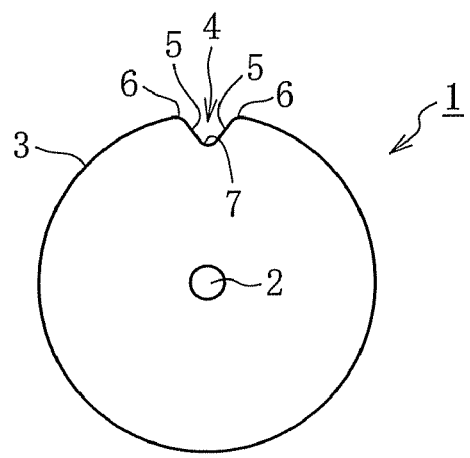
FIG. 2 is a front view illustrating the overall configuration of the capillary tube for holding an optical fiber according to the embodiment of the present invention.
Figure 3:
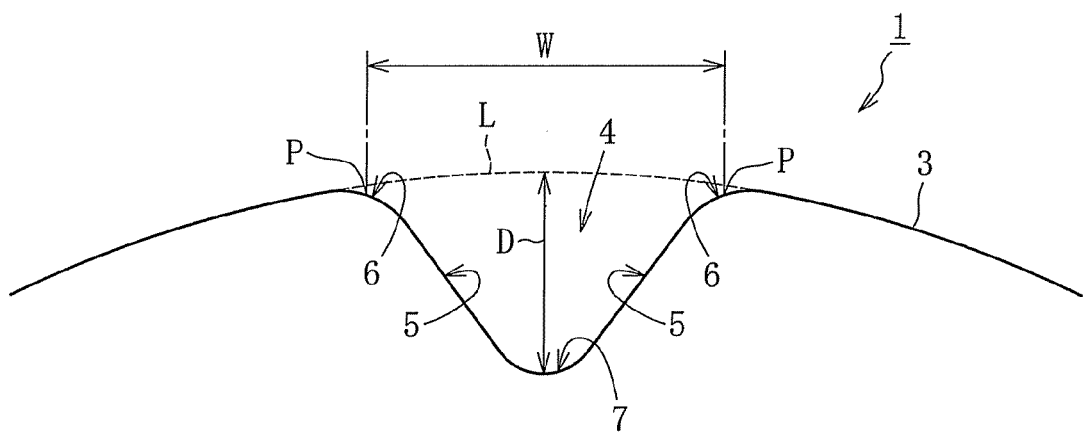
FIG. 3 is an enlarged front view illustrating the main parts of the capillary tube for holding an optical fiber according to the embodiment of the present invention.

FIG. 1 is a perspective view of a capillary tube 1 according to an embodiment of the present invention, FIG. 2 is a front view of the capillary tube 1, and FIG. 3 is an enlarged front view illustrating the main parts of the capillary tube 1. As illustrated in FIGS. 1 and 2, the capillary tube 1 is a columnar body in which an outer circumferential surface is constituted as a cylindrical surface and an insertion hole 2 for inserting and fixing an optical fiber is formed on a central axis, where a groove 4 in an axial direction is formed at the cylindrical surface 3. The region from the cylindrical surface 3 to both inner side surfaces 5 of the groove 4 of the capillary tube 1 is formed with a projecting curved surface 6, and the region from both inner side surfaces 5 of the groove 4 to the bottom of the groove 4 is formed with a recessed curved surface 7.

More specifically, as illustrated in FIG. 3, the projecting curved surface 6 has one end smoothly continuous with the cylindrical surface 3 and the other end smoothly continuous with the inner side surface 5 of the groove 4, and the recessed curved surface 7 has one end smoothly continuous with one inner side surface 5 of the groove 4 and the other end smoothly continuous with the other inner side surface 5 of the groove 4 at the bottom of the groove 4.

Further, both inner side surfaces 5 of the groove 4 are flat portions, and the cross-sectional shape of the groove 4 is basically a V-shape as the inner side surfaces gradually approach each other towards the bottom of the groove 4. The groove 4 is formed with the recessed curved surface 7 from the bottom to both inner side surfaces 5 and is not formed with a bent portion or a step portion at the periphery thereof, and is formed with the projecting curved surface 6 from both inner side surfaces 5 to the cylindrical surface 3 and is not formed with a bent portion or a step portion at the periphery thereof.

Moreover, the cylindrical surface 3 and the surface of the groove 4 (including projecting curved surface 6 and recessed curved surface 7) of the capillary tube 1 are formed as fire polished surfaces. Therefore, the outer circumferential surface of the capillary tube 1 has the surface of the entire region including the groove 4 formed as a fire polished surface.

A maximum depth D of the groove 4 of the capillary tube 1 is equal to or greater than 0.1% and equal to or smaller than 15% of the circumferential length at the outer circumferential surface of the capillary tube 1. The maximum depth D of the groove 4 is a distance from the lowest portion of the groove 4 to a virtual extended line L of the cylindrical surface 3, and the circumferential length at the outer circumferential surface of the capillary tube 1 is the circumferential length of when the formed region of the groove 4 is replaced with the above-mentioned virtual extended line L. In this case, the lower limit of the maximum depth D of the groove 4 is preferably 0.5% of the circumferential length, and the upper limit of the maximum depth D of the groove 4 is preferably 10% of the circumferential length.

In addition, a maximum width W of the groove 4 of the capillary tube 1 is equal to or greater than 0.1% and equal to or smaller than 20% of the circumferential length at the outer circumferential surface of the capillary tube 1. The maximum width W of the groove 4 is the width between the projecting curved surfaces 6 at a position P where the respective curvature of the projecting curved surface 6 existing on both sides of the groove 4 is a maximum. In this case, the lower limit of the maximum width W of the groove 4 is preferably 0.5% of the circumferential length, and the upper limit of the maximum width W of the groove 4 is preferably 10% of the circumferential length.

The capillary tube 1 is obtained by cutting a long columnar body formed by being continuously pulled out through wire drawing molding including the insertion hole 2 and the groove 4 to a predetermined length. In the post-step, the capillary tube 1 has the optical fiber inserted, and caused to adhere and fixed to the insertion hole 2, and thereafter, an end surface 1a is angle polished with the optical fiber using the groove 4 as the mark in the tilt direction.

Figure 4:
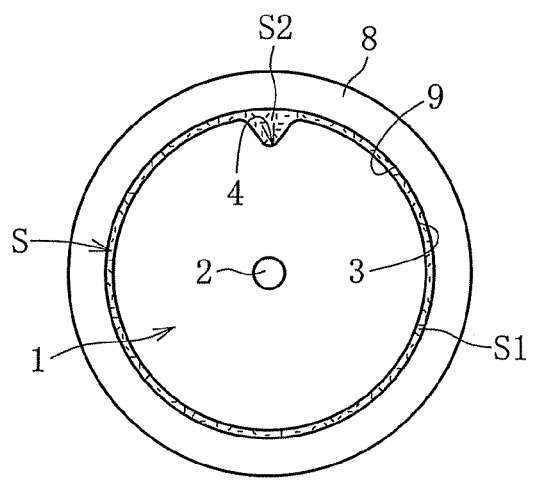
FIG. 4 is a front view illustrating a state in which the capillary tube for holding an optical fiber according to the embodiment of the present invention is caused to adhere and fixed in an inner hole of an external cylinder tube.

Subsequently, as illustrated in FIG. 4, the capillary tube 1 is inserted to the circular inner hole 9 with the adhesive S filled in the circular inner hole 9 of the external cylinder tube (cylindrical tube in this embodiment) 8 having the inner circumferential surface as the cylindrical surface, and the cylindrical tube 8 and the capillary tube 1 are relatively rotated for positioning in the circumferential direction. Under a state in which the adhesive S is cured, a thin adhesive layer S1 is formed between the circular inner hole 9 of the cylindrical tube 8 and the cylindrical surface 3 of the capillary tube 1, and a slight adhesive accumulating layer S2 is formed between the circular inner hole 9 and the groove 4 of the capillary tube 1.

According to the capillary tube 1 including the configuration described above, the groove 4 formed by slightly removing the cylindrical surface 3 is formed at the outer circumferential surface, and thus the visibility is enhanced by using the groove 4 as a mark in the tilt direction when performing angle polishing on the end surface 1a. Further, the projecting curved surface 6 is smoothly continuous from the cylindrical surface 3 at the outer circumferential surface of the capillary tube 1 to both inner side surfaces 5 of the groove 4, and hence the projecting angulated portion does not form at such region. As a result, chips, cracks and the like occur at extremely low probability even when handling, transporting, or conveying the capillary tube 1.

When inserting the capillary tube 1 to the circular inner hole 9 of the cylindrical tube 8, and adhering and fixing the capillary tube 1 by the adhesive, the possibility of chips, cracks, and the like occurring, and the possibility of glass fragment mixing into the adhesive are suppressed because the projecting angulated portion does not exist at the capillary tube 1 even if the adhesive S is filled in the circular inner hole 9 of the cylindrical tube 8 and the cylindrical tube 8 and the capillary tube 1 are relatively rotated for positioning in the circumferential direction. Further, the resistance in time of rotation is avoided from becoming large or inappropriate stirring is avoided from being performed even if the cylindrical tube 8 and the capillary tube 1 are relatively rotated with the adhesive filled in between. Thus, a crucial problem that air bubbles mix into the adhesive is less likely to arise.

Moreover, even if the adhesive between the cylindrical tube 8 and the capillary tube 1 is thermally expanded or contracted after the adhesive S is cured, delaminated is less likely to occur because the volume of the adhesive accumulating layer S2 formed between the cylindrical tube 8 and the groove 4 is small and degradation of optical characteristics caused by inappropriate pushing of the capillary tube 1 by the adhesive S is avoided.

Figure 5A:
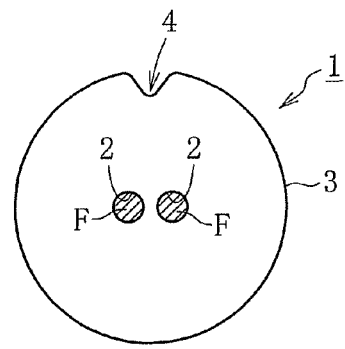
FIG. 5A is a front view illustrating another example of a formation mode related to an insertion hole of an optical fiber formed at the periphery of a central axis of the capillary tube for holding an optical fiber according to the embodiment of the present invention.
Figure 5B:
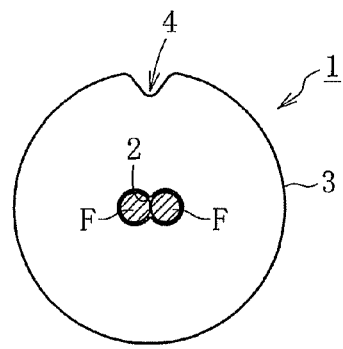
FIG. 5B is a front view illustrating another example of a formation mode related to the insertion hole of an optical fiber formed at the periphery of the central axis of the capillary tube for holding an optical fiber according to the embodiment of the present invention.
Figure 5C:
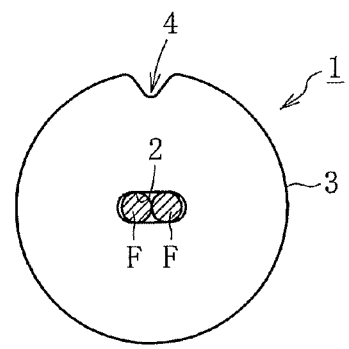
FIG. 5C is a front view illustrating another example of a formation mode related to the insertion hole of an optical fiber formed at the periphery of the central axis of the capillary tube for holding an optical fiber according to the embodiment of the present invention.
Figure 5D:
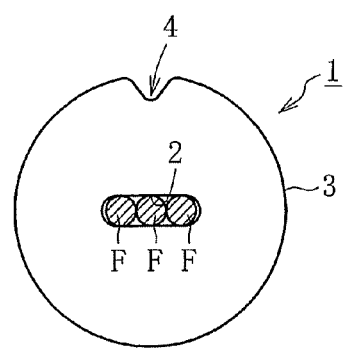
FIG. 5D is a front view illustrating another example of a formation mode related to the insertion hole of an optical fiber formed at the periphery of the central axis of the capillary tube for holding an optical fiber according to the embodiment of the present invention.
Figure 5E:
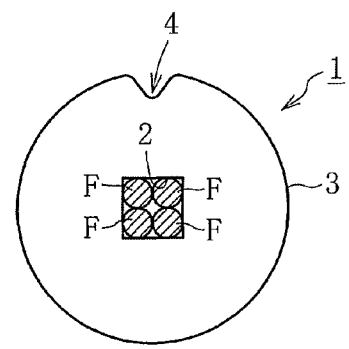
FIG. 5E is a front view illustrating another example of a formation mode related to the insertion hole of an optical fiber formed at the periphery of the central axis of the capillary tube for holding an optical fiber according to the embodiment of the present invention.
Figure 5F:
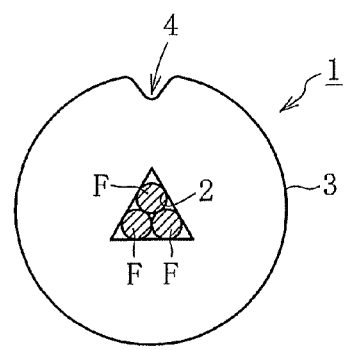
FIG. 5F is a front view illustrating another example of a formation mode related to the insertion hole of an optical fiber formed at the periphery of the central axis of the capillary tube for holding an optical fiber according to the embodiment of the present invention.
Figure 5G:
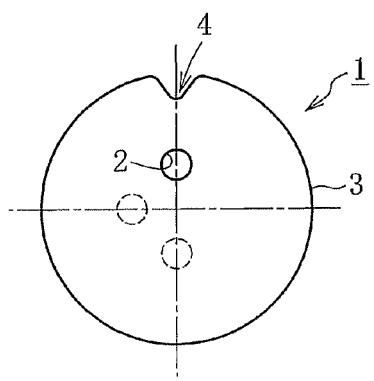
FIG. 5G is a front view illustrating another example of a formation mode related to the insertion hole of an optical fiber formed at the periphery of the central axis of the capillary tube for holding an optical fiber according to the embodiment of the present invention.

FIGS. 5A to 5G illustrate variations related to the insertion hole of the optical fiber formed at the periphery of the central axis of the capillary tube 1 according to the present embodiment. In FIG. 5A, two insertion holes 2 to which two optical fibers F are inserted are formed spaced apart, and in FIG. 5B, two insertion holes 2 to which two optical fibers F are inserted are attached and the communicating portion is constricted. In FIG. 5C, a single oval-shaped insertion hole 2 to which a total of two optical fibers F are inserted on both sides of the central axis is formed, and in FIG. 5D, a single oval-shaped insertion hole 2 to which a total of three optical fibers F are inserted on the central axis and on both sides thereof is formed. In FIG. 5E, a square insertion hole 2 to which a total of four optical fibers F are inserted so as to surround the central axis is formed, and in FIG. 5F, an equilateral triangular-shaped insertion hole 2 to which a total of three optical fibers F are inserted so as to surround the central axis is formed. In FIG. 5G, an insertion hole 2 to which one optical fiber is inserted is formed at a position decentered from the central axis. The groove 4 formed at the outer circumferential surface of the capillary tube 1 not only enhances the visibility by serving as a mark in the tilt direction of the end surface 1a, but also serves as a mark for determining the directivity of the insertion hole 2 of FIGS. 5A to 5G.

Figure 6:
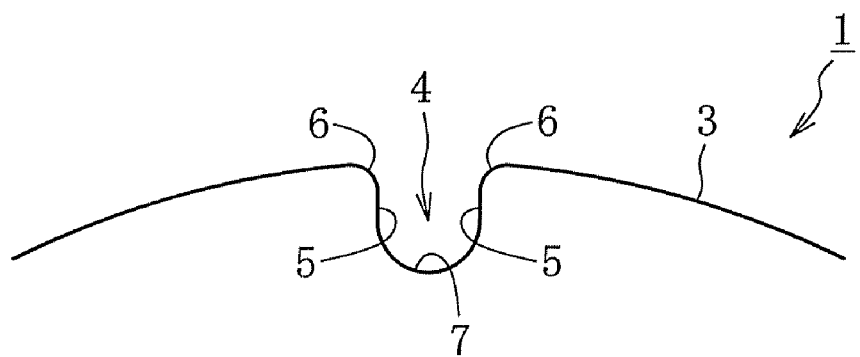
FIG. 6 is an enlarged front view illustrating the main parts of a capillary tube for holding an optical fiber according to another embodiment of the present invention.
Figure 7:
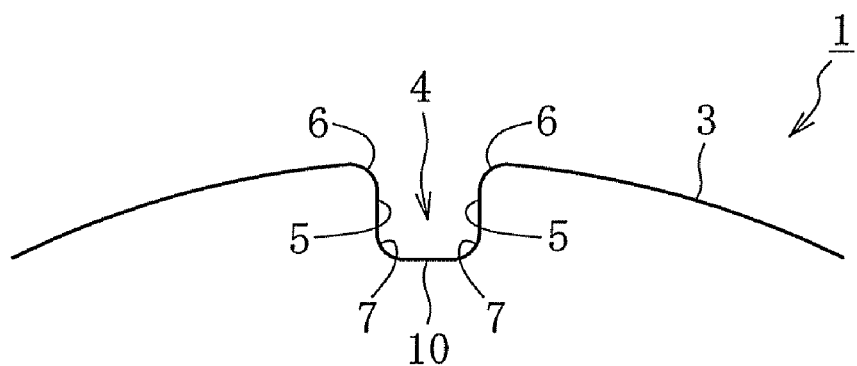
FIG. 7 is an enlarged front view illustrating the main parts of the capillary tube for holding an optical fiber according to another embodiment of the present invention.

Other embodiments of the present invention illustrated in FIGS. 6 and 7 illustrate shapes of the groove 4 formed in the capillary tube 1 different from those described above. In other words, the capillary tube 1 illustrated in FIG. 6 has both inner side surfaces 5 of the groove 4 parallel to each other and the bottom of the groove 4 formed with a single recessed curved surface 7. It is substantially the same as the embodiment described above (see FIG. 3) in that the cylindrical surface 3 and both inner side surfaces 5 of the groove 4 are continuous with each other by way of the projecting curved surface 6, and in that the maximum depth D and the maximum width W of the groove 4 are substantially the same. The capillary tube 1 illustrated in FIG. 7 has both inner side surfaces 5 of the groove 4 parallel to each other and a bottom surface 10 of the groove 4 formed to a flat portion so as to be substantially perpendicular to both inner side surfaces 5, where both ends of the bottom surface 10 and both inner side surfaces 5 are continuous with each other by way of the recessed curved surface 7. In this case as well, the relevant embodiment is substantially the same as the embodiment described above (see FIG. 3) in that the cylindrical surface 3 and both inner side surfaces 5 of the groove 4 are respectively continuous with each other by way of the projecting curved surface 6, and in that the maximum depth D and the maximum width W of the groove 4 are substantially the same. Operation effects substantially the same as the embodiment described above are also obtained by such configurations.

EXAMPLE 1

The inventors of the present invention confirmed the visibility of the groove 4 and confirmed the state of delaminated of the adhesive when the capillary tube 1 is caused to adhere and fixed in the circular inner hole 9 of the cylindrical tube 8 as illustrated in FIG. 4 with respect to examples 1 to 16 of the present invention fabricated while differing the maximum width W and the maximum depth D of the groove 4 in the capillary tube 1 illustrated in FIGS. 1 to 3. The results are shown in Table 1 and Table 2.

In this case, examples 1 to 8 shown in Table 1 below show the confirmed results of when the maximum depth D of the groove 4 is constant and the maximum width W is differed, and examples 9 to 16 shown in Table 2 below show the confirmed results in the case where the maximum width W of the groove 4 is constant and the maximum depth D is differed. In Table 1 and Table 2, Δ means slightly poor but no particular problem is found, ○ means good, and ⊚ means excellent.

TABLE 1

|  | Example | | | | | | | |
|---|---|---|---|---|---|---|---|---|
|  | 1 | 2 | 3 | 4 | 5 | 6 | 7 | 8 |
| Maximum width of groove (%) | 0.08 | 0.10 | 0.50 | 1.0 | 5.0 | 10.0 | 20.0 | 22.0 |
| Maximum depth of groove (%) | 5.0 | 5.0 | 5.0 | 5.0 | 5.0 | 5.0 | 5.0 | 5.0 |
| Recognition | Δ | ○ | ○ | ⊚ | ⊚ | ⊚ | ⊚ | ⊚ |
| Prevention of delaminate | ⊚ | ⊚ | ⊚ | ⊚ | ⊚ | ⊚ | ○ | Δ |

TABLE 2

|  | Example | | | | | | | |
|---|---|---|---|---|---|---|---|---|
|  | 9 | 10 | 11 | 12 | 13 | 14 | 15 | 16 |
| Maximum width of groove (%) | 5.0 | 5.0 | 5.0 | 5.0 | 5.0 | 5.0 | 5.0 | 5.0 |
| Maximum depth of groove (%) | 0.08 | 0.10 | 0.50 | 1.0 | 5.0 | 10.0 | 15.0 | 15.5 |
| Recognition | Δ | ○ | ○ | ⊚ | ⊚ | ⊚ | ⊚ | ⊚ |
| Prevention of delaminated | ⊚ | ⊚ | ⊚ | ⊚ | ⊚ | ⊚ | ○ | Δ |

According to Table 1 described above, if the maximum depth D of the groove 4 is 5% of the circumferential length, the visibility was slightly poor when the maximum width W of the groove 4 was 0.08% of the circumferential length and prevention of delaminated was slightly poor when the maximum width W was 22.0% of the circumferential length, but the results were good or excellent in other examples. According to Table 2 described above, if the maximum width W of the groove 4 is 5.0% of the circumferential length, the visibility was slightly poor when the maximum depth D of the groove 4 was 0.08% of the circumferential length, and the prevention of the elaminated was slightly poor when the maximum depth D was 15.5% of the circumferential length, but the results were good or excellent in other examples.

What is claimed is:

1. A capillary tube for holding an optical fiber, the capillary tube comprising:
   an insertion hole for inserting and fixing the optical fiber;
   a cylindrical surface as an outer circumferential surface; and
   a groove formed in the cylindrical surface in an axial direction thereof, the groove having inner side surfaces and a bottom, wherein
   regions from the cylindrical surface to both the inner side surfaces of the groove each form a projecting curved surface, and regions from both the inner side surfaces of the groove to the bottom of the groove form at least one recessed curved surface,
   the capillary tube is inserted to an external cylindrical tube having an inner circumferential surface that is a cylindrical surface, and
   the capillary tube and the external cylindrical tube are relatively rotated, with an adhesive filled between the capillary tube and the external cylindrical tube, for positioning the capillary tube in a circumferential direction relative to the external cylinder tube.

2. A capillary tube for holding the optical fiber according to claim 1, wherein each of the projecting curved surfaces has one end smoothly continuous with the cylindrical surface and another end smoothly continuous with one of the inner side surfaces of the groove.

3. A capillary tube for holding the optical fiber according to claim 1, wherein the recessed curved surface has one end smoothly continuous with one of the inner side surfaces of the groove and another end smoothly continuous with another of the inner side surfaces of the groove at the bottom of the groove.

4. A capillary tube for holding the optical fiber according to claim 3, wherein the one inner side surface and the another inner side surface of the groove gradually approach each other toward the bottom of the groove.

5. A capillary tube for holding the optical fiber according to claim 4, wherein the capillary tube is made of glass material, and the cylindrical surface and surfaces of the groove are fire polished surfaces.

6. A capillary tube for holding the optical fiber according to claim 4, wherein a maximum depth of the groove is equal to or greater than 0.1% and equal to or smaller than 15% of a circumferential length at the outer circumferential surface of the capillary tube.

7. A capillary tube for holding the optical fiber according to claim 6, wherein a maximum width of the groove is equal to or greater than 0.1% and equal to or smaller than 20% of the circumferential length at the outer circumferential surface of the capillary tube.

8. A capillary tube for holding the optical fiber according to claim 2, wherein the recessed curved surface has one end smoothly continuous with one of the inner side surfaces of the groove and another end smoothly continuous with another of the inner side surfaces of the groove at the bottom of the groove.

* * * * *